(12) United States Patent
Ehring et al.

(10) Patent No.: US 12,135,276 B2
(45) Date of Patent: Nov. 5, 2024

(54) OPTICAL FLOW CELL

(71) Applicant: Cytiva Sweden AB, Uppsala (SE)

(72) Inventors: Hanno Ehring, Uppsala (SE); Mats Rimmo, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 364 days.

(21) Appl. No.: 16/464,778

(22) PCT Filed: Nov. 30, 2017

(86) PCT No.: PCT/EP2017/080957
§ 371 (c)(1),
(2) Date: May 29, 2019

(87) PCT Pub. No.: WO2018/100055
PCT Pub. Date: Jun. 7, 2018

(65) Prior Publication Data
US 2019/0317009 A1   Oct. 17, 2019

(30) Foreign Application Priority Data

Nov. 30, 2016 (GB) ..................................... 1620294

(51) Int. Cl.
*G01N 21/01* (2006.01)
*G02B 6/36* (2006.01)
(52) U.S. Cl.
CPC ................ *G01N 21/01* (2013.01); *G02B 6/36* (2013.01); *G01N 2201/066* (2013.01); *G01N 2201/08* (2013.01)
(58) Field of Classification Search
CPC ..... G01N 21/01; G01N 2201/066; G02B 6/36
See application file for complete search history.

(56) References Cited

U.S. PATENT DOCUMENTS 3,503,683 A * 3/1970 Heimann ............. G01N 21/251
356/36
4,707,071 A 11/1987 Kraft
(Continued)

FOREIGN PATENT DOCUMENTS

EP         0426149 A2   10/1990
GB         1471190       4/1977
(Continued)

OTHER PUBLICATIONS

Anderson, N. G. "Quartz Flow Cells for Continuous Spectrophotometric Analysis Column Effluents." Analytical Chemistry 33.7 (1961): 970-971.*

(Continued)

*Primary Examiner* — Rebecca C Bryant
(74) *Attorney, Agent, or Firm* — Eversheds-Sutherland (US) LLP

(57) ABSTRACT

An optical measuring device (1; 1'; 1"; 41; 61) configured for being connected in a flow path, said optical measuring device (1; 1'; 1"; 41; 61) comprising:—a first and a second flow path connector (5, 7; 5', 7'; 5", 7");—at least one flow cell part (3; 3a, 3b; 3a, 3b, 3c, 3d) provided in between the first and second flow path connectors (5, 7; 5', 7'; 5", 7") such that a flow in a flow path in which the optical measuring device (1; 1'; 1"; 41; 61) can be arranged will flow through the first flow path connector (5; 5'; 5"), the at least one flow cell part (3; 3a, 3b; 3a, 3b, 3c, 3d) and through the second flow path connector (7; 7'; 7"); and—at least one releasable connection device (9) arranged for releasably connecting the at least one flow cell part (3; 3a, 3b; 3a, 3b, 3c, 3d) in between the first and second flow path connectors (5, 7; 5', 7'; 5", 7").

12 Claims, 7 Drawing Sheets

(56)     References Cited

U.S. PATENT DOCUMENTS

| | | | |
|---|---|---|---|
| 4,714,317 A | 12/1987 | Szentesi | |
| 4,767,178 A | 8/1988 | Sasaki et al. | |
| 4,988,155 A | 1/1991 | Harner et al. | |
| 5,521,384 A | 5/1996 | Lynch | |
| 8,125,626 B2* | 2/2012 | Furtaw | G01N 21/3504 |
| | | | 356/72 |
| 9,625,378 B2* | 4/2017 | Marshall | G01N 21/39 |
| 10,261,008 B2* | 4/2019 | Svanberg | G01N 21/05 |
| 2002/0154309 A1 | 10/2002 | Walker et al. | |
| 2013/0215412 A1 | 8/2013 | Wynn | |
| 2017/0370826 A1* | 12/2017 | Coombs | G01N 21/0303 |

FOREIGN PATENT DOCUMENTS

| | | | | |
|---|---|---|---|---|
| GB | 2099605 A | 12/1982 | | |
| JP | S5835506 A | 3/1983 | | |
| JP | H0219809 A | 1/1990 | | |
| JP | H03205535 A | 9/1991 | | |
| JP | H08304178 A | 11/1996 | | |
| JP | H10325797 A | 12/1998 | | |
| JP | 2013122397 A | 6/2013 | | |
| WO | WO-2005116614 A1 * | 12/2005 | | G01N 21/05 |

OTHER PUBLICATIONS

PCT International Search Report and Written Opinion for PCT Application No. PCT/Ep2017/080957 mailed Feb. 16, 2018 (14 pages).

Great Britain Search Report for GB Application No. 1620294.7 mailed Jun. 7, 2017 (3 pages).

JP, "Office Action" App. No. 2019-546892, mailed Oct. 4, 2021, 14 pages.

\* cited by examiner

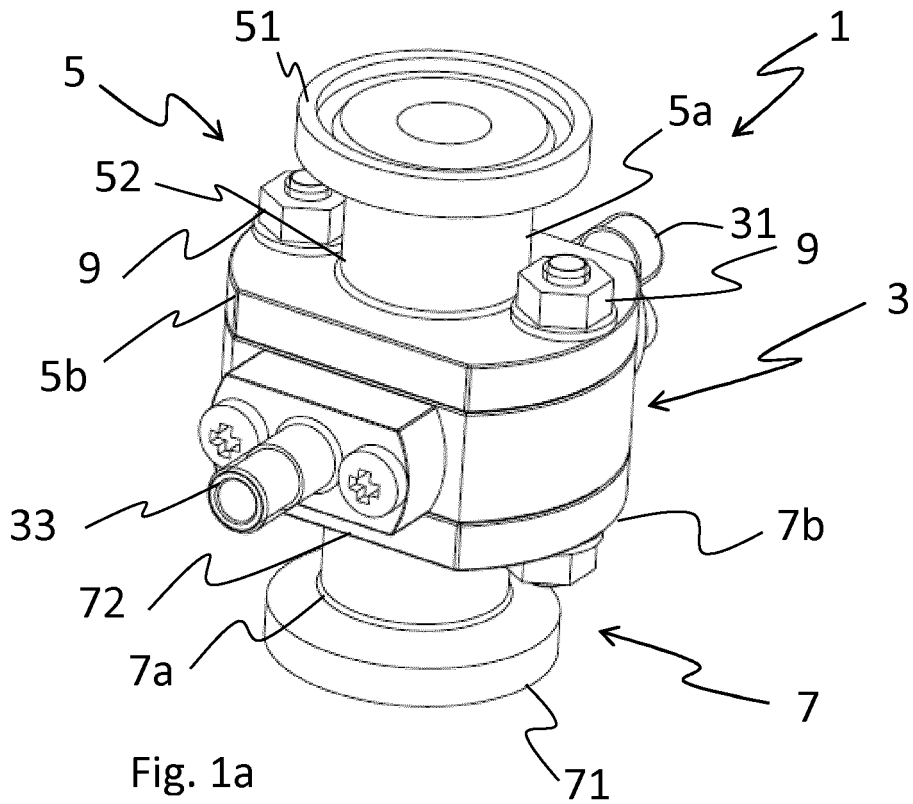
Fig. 1a
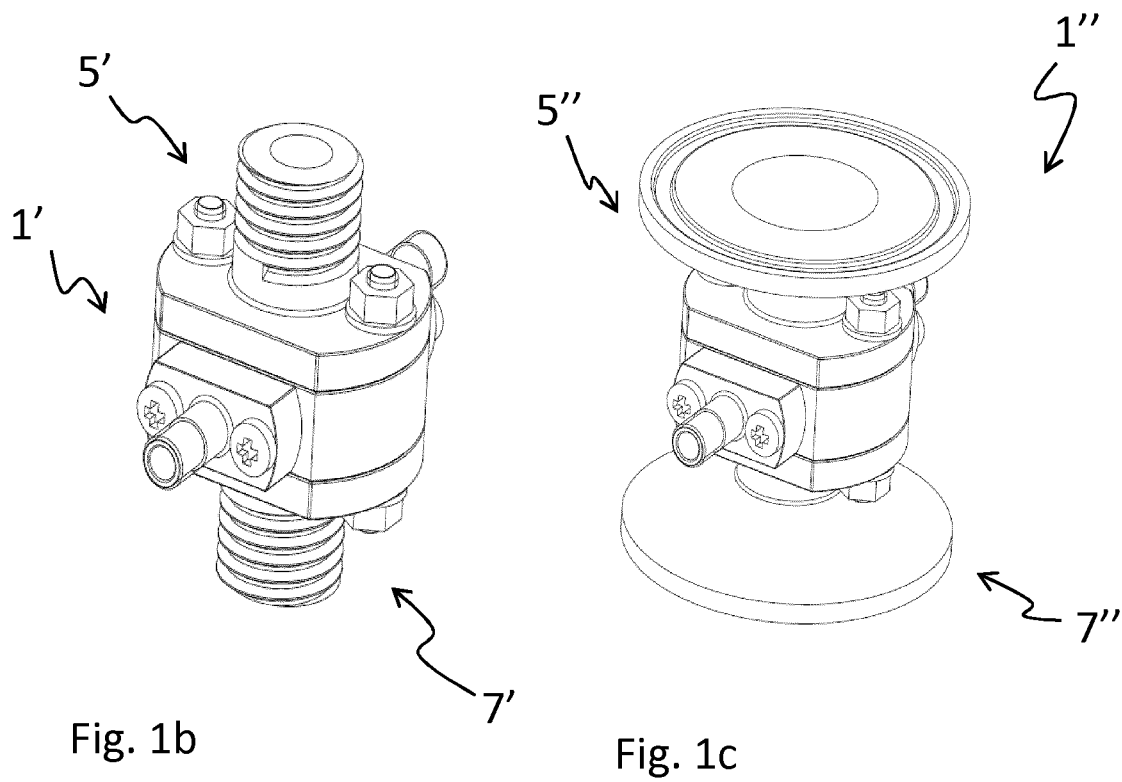
Fig. 1b
Fig. 1c

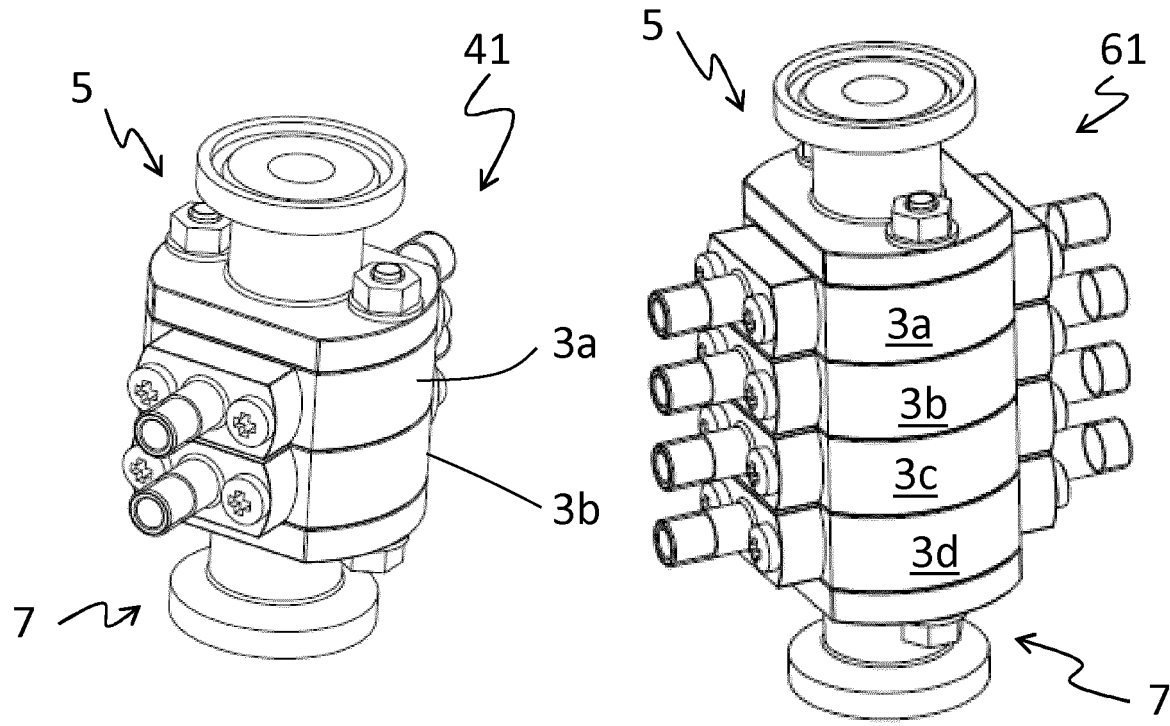
Fig. 6
Fig. 7a
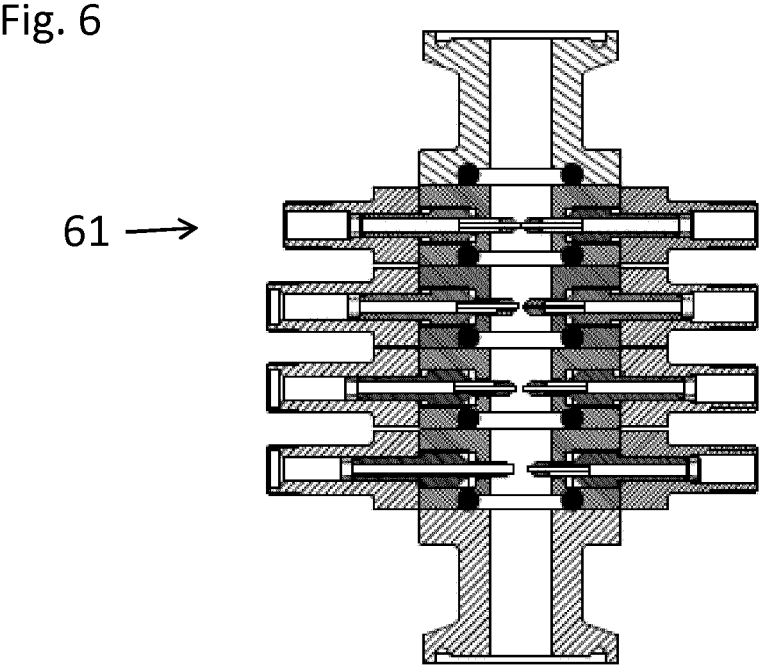
Fig. 7b

OPTICAL FLOW CELL

CROSS REFERENCE TO RELATED APPLICATIONS

This application claims the priority benefit of PCT/EP2017/080957 filed on Nov. 30, 2017 which claims priority benefit of Great Britain Application No. 1620294.7, filed Nov. 30, 2016. The entire contents of which are hereby incorporated by reference herein.

TECHNICAL FIELD OF THE INVENTION

The present invention relates to an optical measuring device configured for being connected in a flow path and to a method for mounting such an optical measuring device in a flow path.

BACKGROUND

Optical measuring devices are used within a plurality of technical fields where a solution is allowed to flow across an optical flow cell that serves to detect the presence of and/or measuring the concentration of a substance within the solution. Examples of such technical fields are fluid chromatography and filtering, among others.

The flow cells used in the measuring devices are generally optical flow cells, having a first light guide with an exit surface where light is emitted and a second light guide with an entrance surface where light is received. Exit and entrance surfaces can be windows or light guides made of material that has sufficient transmittance of the wavelength used. The distance between the exit surface and entrance surface can be relatively long for solutions of lower concentration, but in order to achieve reliable detection also for solutions of high concentration the distance should be smaller, typically in the range of 0,1-0,5 mm. To achieve satisfactory quality of measurements, the distance must be kept constant and is not allowed to deviate from a set value more than 5%. In some applications solutions of both high and low concentration need to be measured.

A common problem within this area is that corrections or adjustments to the optical flow cell such as after a cleaning or service operation of the measuring device can create such deviations and render the optical flow cell unreliable or requiring cumbersome calibration operations before normal operation can resume. The calibration is often performed through the use of a reference solution with a known concentration, and a series of measurements in order to allow the distance between the light guides of the optical flow cell to be adjusted or the result to be corrected by software to reflect the change in path length. This, however, is a time consuming process and may also require extensive cleaning of the measuring device afterwards to remove all traces of the reference solution. Alternatively, the optical flow cell can be used without calibrations but the resulting data will be unreliable and unusable in many applications.

There may also be problems in prior art flow cells when both high and low concentrations need to be measured. Changing the path length within the flow cell would often require new calibrations.

There is therefore clearly a need for a more flexible and reliable optical measuring device to overcome these drawbacks.

SUMMARY

An object of the present invention is to provide an improved and more flexible optical measuring device.

This is achieved in an optical measuring device according to claim 1 and in a method for mounting such an optical measuring device in a flow path according to claim 12.

In one aspect of the invention an optical measuring device configured for being connected in a flow path is provided. Said optical measuring device comprising:
  a first and a second flow path connector;
  at least one flow cell part provided in between the first and second flow path connectors such that a flow in a flow path in which the optical measuring device can be arranged will flow through the first flow path connector, the at least one flow cell part and through the second flow path connector; and
  at least one releasable connection device arranged for releasably connecting the at least one flow cell part in between the first and second flow path connectors.

In another aspect of the invention a method for mounting such an optical measuring device in a flow path is provided. Said method comprising the steps of:
  providing the at least one flow cell part between the first and second flow path connectors;
  connecting the at least one flow cell part between the first and second flow path connectors by the connection device;
  connecting the first and second flow path connectors in a flow path.

Hereby different optical path lengths can be provided at the same time in the same optical measuring device by providing two or more flow cell parts between the first and second flow path connector. If only one optical path length is needed only one flow cell part is provided between the first and second flow path connector. Furthermore the modular concept of the optical measuring device according to the invention allows maintenance and change of flow cell part without affecting the path lengths in each flow cell part. Measuring accuracy is maintained after for example maintenance because the flow cell parts are static, pre-calibrated parts. Furthermore different connection sizes and connection types can be provided to the optical measuring device by only changing the flow path connectors for different types of flow paths.

In one embodiment of the invention the optical measuring device further comprises at least one sealing device provided in between each flow path connector and the at least one flow cell part and between each flow cell part if more than one are provided, said sealing device being provided for keeping a flow provided through the optical measuring device from a connected flow path inside the optical measuring device.

In one embodiment of the invention the at least one flow cell part comprises a fixedly mounted light transmitting device and a fixedly mounted light receiving device, wherein an optical path of fixed length is provided between a light transmitting end of the light transmitting device and a light receiving end of the light receiving device and wherein said light transmitting device is configured to be connected to a light source and said light receiving device is configured to be connected to a detector and wherein said optical path is configured to be provided in a flow which will be transferred through the optical measuring device when it is connected to a flow path. Hereby a static flow cell part is provided having a fixed optical path length. The path length can be pre-calibrated and maintenance can hereby be performed to the optical measuring device without affecting the optical path length and measuring accuracy. Maintenance could for example be to change sealing.

In one embodiment of the invention at least two flow cell parts having different optical path lengths are provided in the optical measuring device.

In one embodiment of the invention the light transmitting device and the light receiving device are optical fibers fixedly mounted in the flow cell part such that they protrude into a flow cell part flow passage of the flow cell part through which flow passage the flow will pass when the optical measuring device is connected to a flow path.

In one embodiment of the invention a connection end of the light transmitting device being the opposite end to the light transmitting end is provided with a distance cap and a connection end of the light receiving device being the opposite end to the light receiving end is provided with a distance cap, said distance caps being arranged to assure that a distance is kept between the light transmitting device and a connecting optical fiber and between the light receiving device and a connecting fiber.

In one embodiment of the invention the connection device is at least one screw and nut and the first and second flow path connectors and the at least one flow cell part comprises mating connection device receiving holes for receiving the at least one screw during connection. Another example of a connection device is one or more clamps.

In one embodiment of the invention the first and second flow path connectors comprise a flow path connecting part and a flange part, wherein said flange part comprises at least two diametric oppositely provided connection device receiving holes.

In one embodiment of the invention the first and second flow path connectors can be adapted for different sizes of connecting flow paths and for different types of connectors.

In one embodiment of the invention each flow cell part is a fixed unit without replaceable parts.

In one embodiment of the invention a first light guide holder is provided to a first end of the flow cell part and is arranged to provide connection capabilities for a connecting light guide to the light transmitting device of the flow cell part and a second light guide holder is provided to a second end of the flow cell part and is arranged to provide connection capabilities for a connecting light guide to the light receiving device of the flow cell part.

In one embodiment of the invention the step of providing at least one flow cell part comprises providing at least two flow cell parts having different optical path lengths.

BRIEF DESCRIPTION OF THE DRAWINGS

FIG. 1a is a perspective view of an optical measuring device according to one embodiment of the invention.

FIG. 1b is a perspective view of an optical measuring device according to another embodiment of the invention.

FIG. 1c is a perspective view of an optical measuring device according to another embodiment of the invention.

FIG. 2 is an exploded view of the embodiment shown in FIG. 1a.

FIG. 4 is a cross-section of the same optical measuring device as shown in FIG. 1a.

FIG. 6 is a perspective view of an optical measuring device according to one embodiment of the invention.

FIG. 7a is a perspective view of an optical measuring device according to one embodiment of the invention.

FIG. 7b is a cross-section of the same optical measuring device as shown in FIG. 7a.

DETAILED DESCRIPTION OF THE INVENTION

According to the invention an optical measuring device is provided which is configured for being connected in a flow path. Said optical measuring device comprises a first and a second flow path connector and at least one flow cell part provided in between the first and second flow path connectors such that a flow in a flow path in which the optical measuring device can be arranged will flow through the first flow path connector, the at least one flow cell part and through the second flow path connector. The optical measuring device comprises furthermore at least one releasable connection device arranged for releasably connecting the at least one flow cell part in between the first and second flow path connectors. The separate flow path connectors and the releasable connection device provides for a modular system, i.e. the optical measuring device can be configured differently for different uses. For example more than one flow cell part can be provided between the first and second flow path connectors and these flow cell parts can have different optical path lengths. An optical path length in the flow cell part is a distance between a light transmitting device and a light receiving device provided within the flow which will pass the flow cell part when the optical measuring device is connected in a flow path. A short optical path length is suitable for measuring high concentrations of a substance within the solution provided in the flow and a longer optical path length can be suitable for lower concentrations. In some applications it may be suitable to measure both low and high concentrations of a substance in the flow and therefore different optical path lengths might be needed at the same time. Furthermore, according to the invention different sizes and connector types for connection of the first and second flow path connectors to a flow path can be provided, i.e. the flow path connectors can be exchanged between uses. Different embodiments of the invention are described in detail below.

Figure 2:
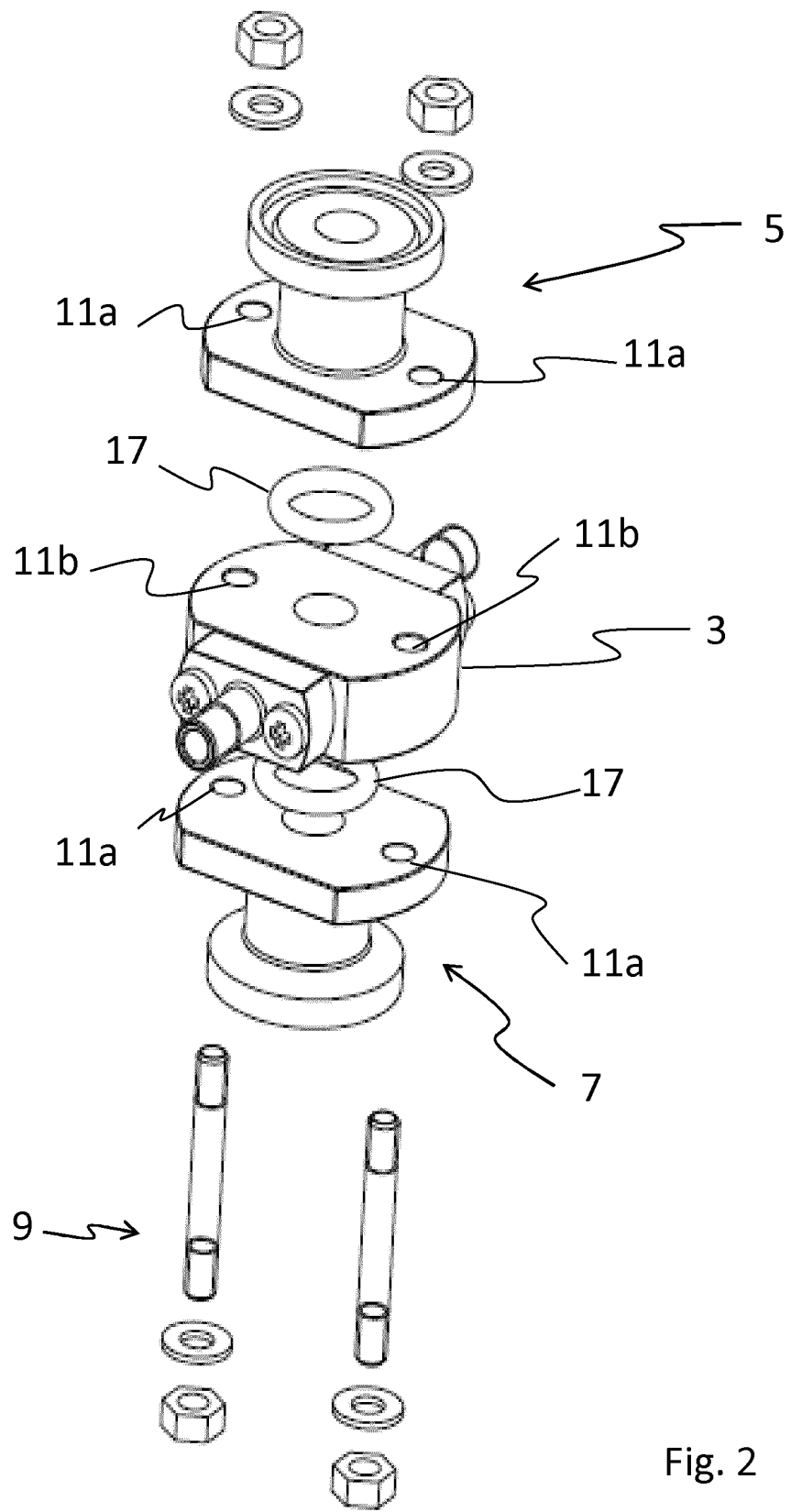
Figure 4:
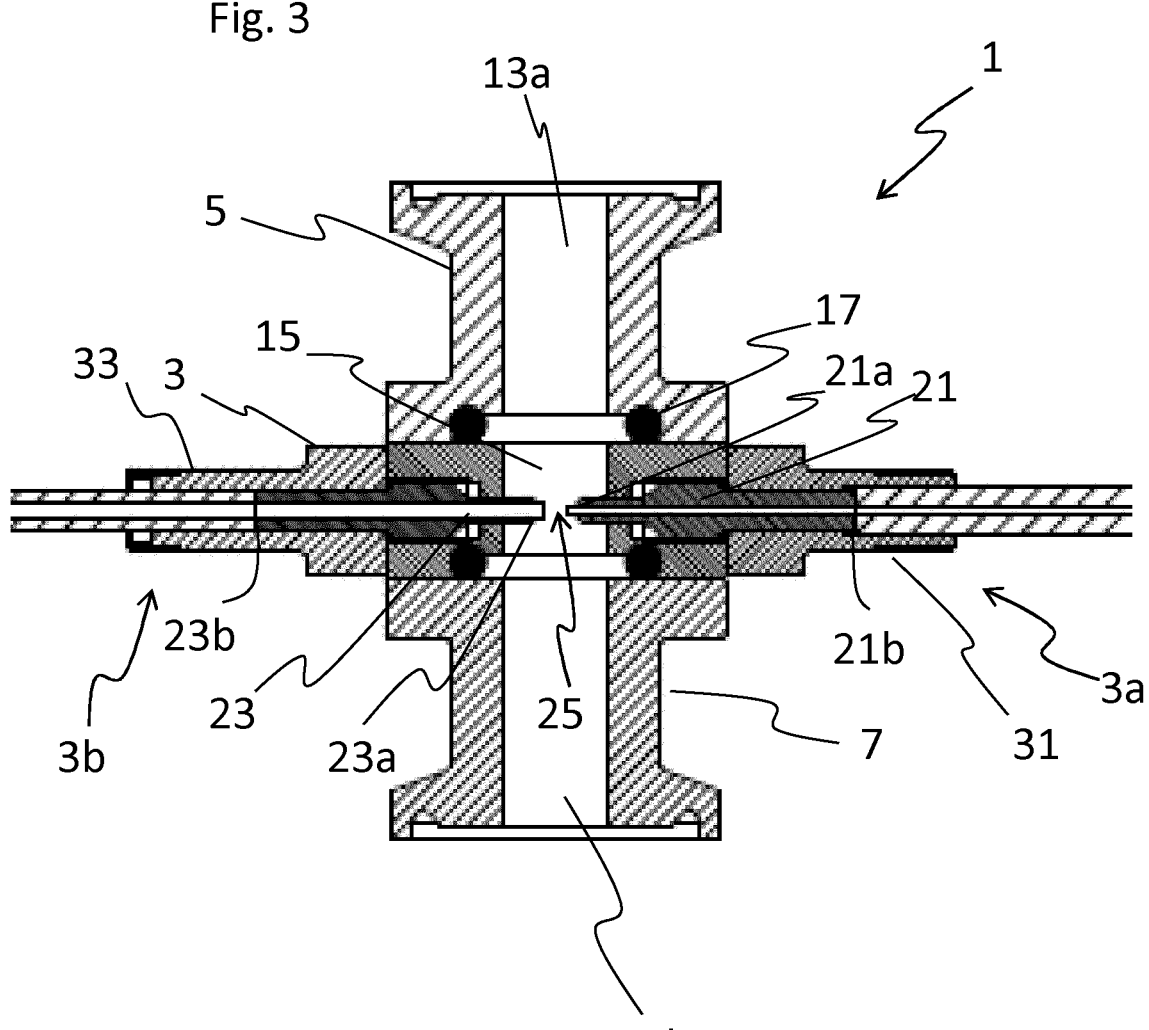

FIG. 1a is a perspective view of an optical measuring device 1 according to one embodiment of the invention. FIG. 4 is a cross-section of the same optical measuring device 1 as shown in FIG. 1a and FIG. 2 is an exploded view of the same embodiment. One flow cell part 3 is shown connected between a first flow path connector 5 and a second flow path connector 7. The three parts are connected by a releasable connection device 9. In this embodiment of the invention the releasable connection device 9 is shown to be a screw and a nut provided through connection device receiving holes 11a, 11b (which can be seen in FIG. 2) provided in both the flow cell part 3 and in the first and second flow path connectors 5, 7. Another possible type of releasable connection device 9 to be used in all the embodiments described in this patent application is one or more clamps. In the embodiment shown in FIG. 1a two connection devices 9 are provided. The first and second flow path connectors 5, 7 comprise each a flow path connecting part 5a, 7a and a flange part 5b, 7b. The flow path connecting part 5a, 7a is in this embodiment a hollow tube formed part having a first end 51, 71 configured for connection to a flow path and a second end 52, 72 which is surrounded by the flange part 5b, 7b. Said flange part 5b, 7b comprises two connection device receiving holes 11a positioned diametrically opposite each other on the flange (can be seen in FIG. 2). The flange part 5b, 7b is arranged for providing connection capabilities of the flow path connector 5, 7 to the flow cell part 3. The flow cell part 3 comprises corresponding connection device receiving holes 11b (can be seen in FIG. 2).

A flow passage 13a, 13b (seen in FIG. 4) is provided within the first and second flow path connectors 5, 7 and a flow cell part flow passage 15 is provided in the flow cell part 3. When the flow cell part 3 is connected between the first and second flow path connectors 5, 7 the flow passages 13a, 13b of the first and second flow path connectors 5, 7 and the flow cell part flow passage 15 are connected such that a flow from a connected flow path will pass through all the flow passages 13a, 13b, 15.

A sealing device 17 is in this embodiment provided between each part of the optical measuring device 1, i.e. in this embodiment one sealing device 17 is provided between the first flow path connector 5 and the flow cell part 3 and one sealing device 17 is provided between the second flow path connector 7 and the flow cell part 3. The sealing devices 17 seal the flow passages in the optical measuring device.

In FIG. 4 internal details of the flow cell part 3 can be seen. In this embodiment of the invention the flow cell part 3 comprises a fixedly mounted light transmitting device 21 and a fixedly mounted light receiving device 23, wherein an optical path 25 of fixed length is provided between a light transmitting end 21a of the light transmitting device 21 and a light receiving end 23a of the light receiving device 23 and wherein said light transmitting device 21 is configured to be connected to a light source and said light receiving device 23 is configured to be connected to a detector and wherein said optical path 25 is configured to be provided in a flow which will be transferred through the optical measuring device when it is connected to a flow path. The light transmitting device 21 is here shown to be provided on the right side of the flow cell part and the light receiving device 23 on the left side however this could of course also be the opposite. Hereby the optical path 25 is provided within the flow cell part flow passage 15. Actually, in this embodiment of the invention the light transmitting device 21 and the light receiving device 23 are fixedly mounted optical fibers which are protruding into the flow cell part flow passage 15 and leaving a distance between them being the optical path 25. However in another embodiment of the invention one or both of the light transmitting device 21 and the light receiving device 23 could be for example a lens, a window, a molded transparent polymer formed to provide light input and output or a machined glass part.

Figure 8:
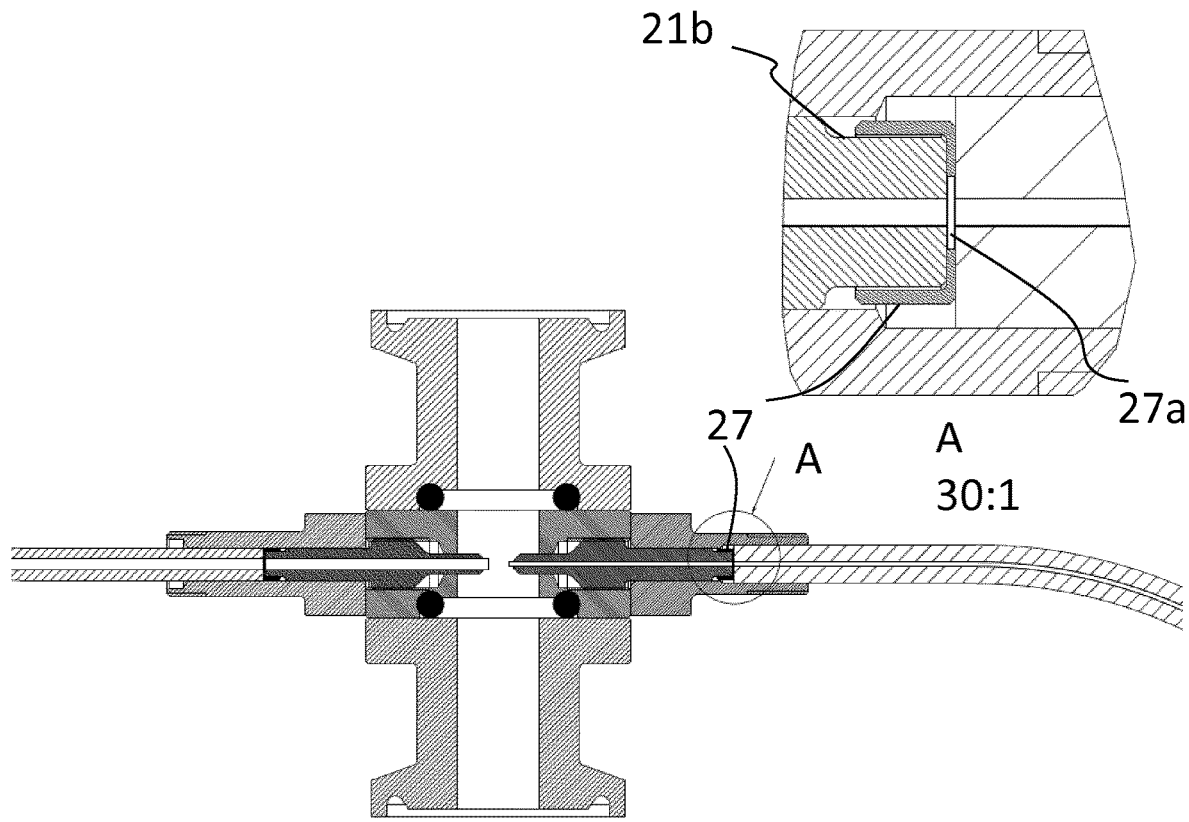
FIG. 8 shows a distance cap which can be provided in the embodiments described in this patent application.

A connection end 21b of the light transmitting device 21, being the opposite end to the light transmitting end 21a, is in one embodiment of the invention provided with a distance cap 27 (can be seen in FIG. 8) and a connection end 23b of the light receiving device 23 being the opposite end to the light receiving end 23a can be provided with a similar distance cap 27, said distance caps 27 being arranged to assure that a distance is kept between the light transmitting device 21 and a connecting optical fiber and between the light receiving device 23 and a connecting optical fiber. Direct contact between the light transmitting device/light receiving device and connecting fibers needs to be avoided due to possible abrasion and instable transmission properties when dimensions change slightly.

The distance cap 27 is configured for being provided between two connecting optical fibers in order to provide optical connection but to keep a distance between the fibers. In this embodiment the distance cap 27 is provided to an outer end of one of the connecting fibers 21b such that it covers the outer end leaving an opening 27a in the middle of the fiber diameter for optical connection with the connecting optical fiber. The material of the distance cap 27 can be a metal or a polymer which is hard such it is not deformed when compressed. In another embodiment (not shown here) a specially designed end in the meeting fiber can be provided for ensuring correctly connection.

In this embodiment of the invention a first light guide holder 31 is furthermore provided to a first end 3a of the flow cell part 3 and is arranged to provide connection capabilities for a connecting light guide to the light transmitting device 21 of the flow cell part 3 and a second light guide holder 33 is provided to a second end 3b of the flow cell part 3 and is arranged to provide connection capabilities for a connecting light guide to the light receiving device 23 of the flow cell part 3. In an alternative embodiment another type of light source could be provided instead of an optical fiber such as for example a LED. Furthermore in an alternative embodiment a detector could be provided directly in the flow cell part 3 instead of a connecting optical fiber.

Figure 3:
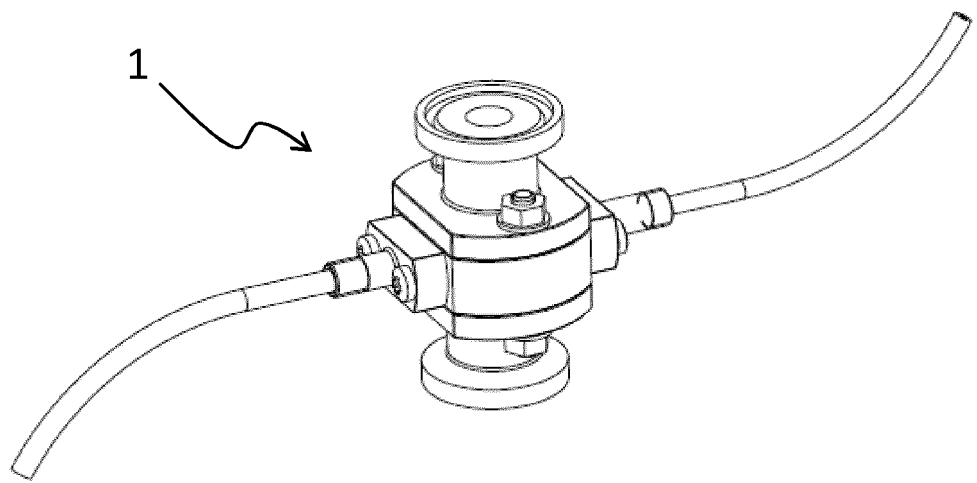
FIG. 3 shows the optical measuring device of FIG. 1 a connected to optical fibers.

FIG. 3 shows the optical measuring device of FIG. 1a connected to optical fibers.

FIG. 1b shows another embodiment of an optical measuring device 1' according to the invention. In this embodiment of the invention the first and second flow path connectors 5', 7' are provided with another type of connecting means, in this example threaded connection.

FIG. 1c shows another embodiment of an optical measuring device 1" according to the invention. In this embodiment of the invention the first and second flow path connectors 5", 7" are provided with another type of connecting means, in this example configured for connection to larger tubes.

Figures 5A, 5B:
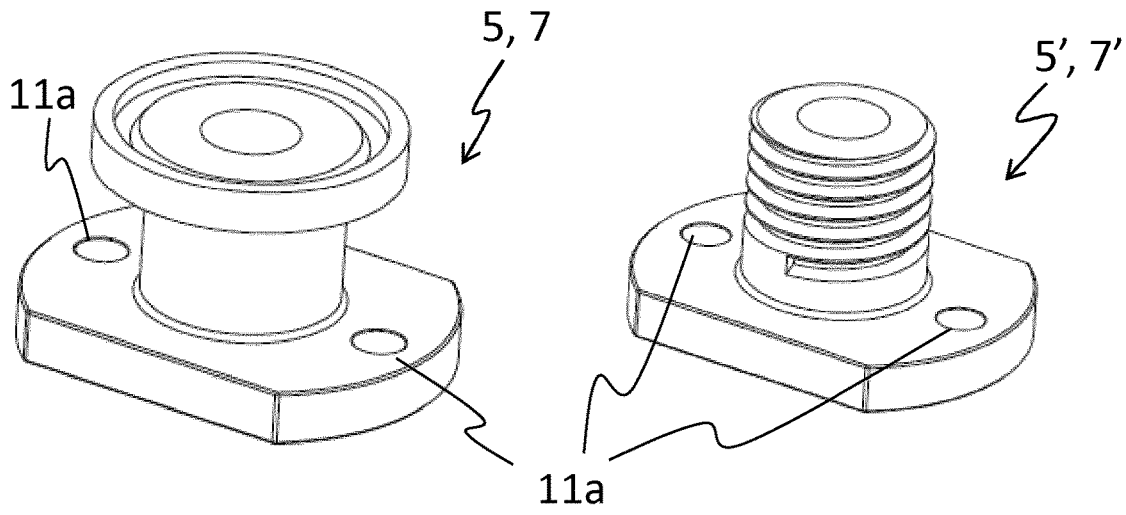
FIG. 5a is a perspective view of a first or second flow path connector of an optical measuring device according to one embodiment of the invention.
FIG. 5b is a perspective view of a first or second flow path connector of an optical measuring device according to another embodiment of the invention.
Figures 5C, 5D:
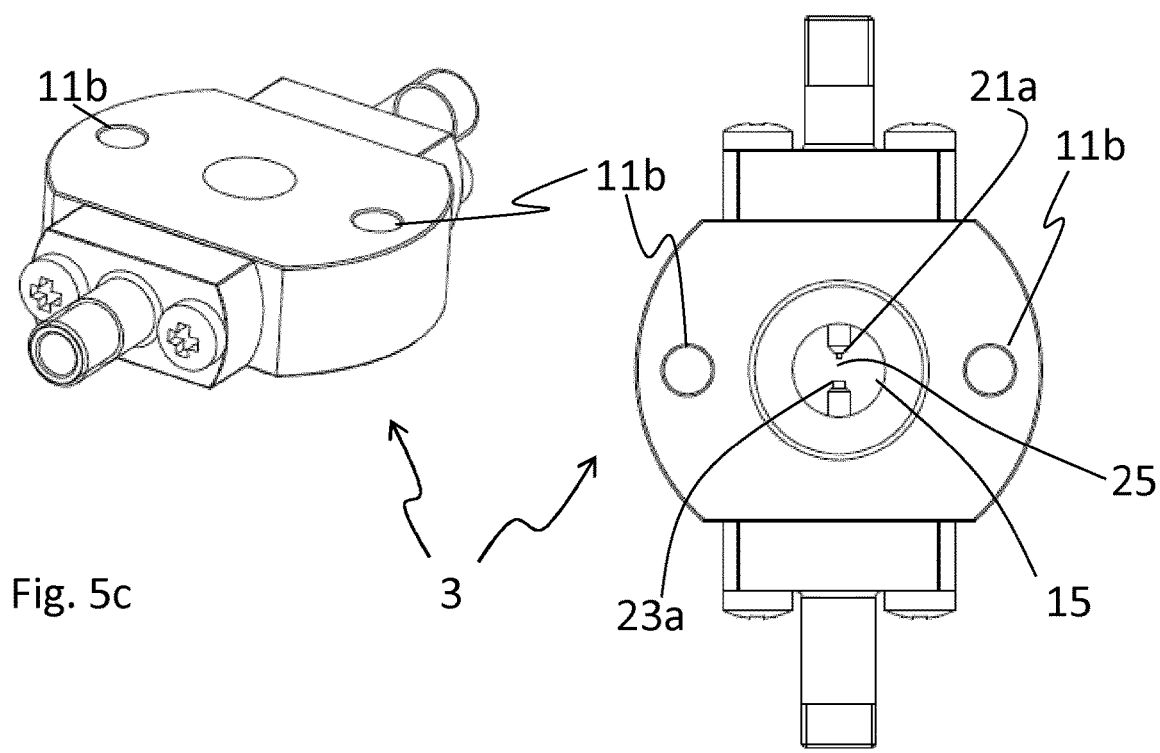
FIG. 5c is a perspective view of a flow cell part according to one embodiment of the invention.
FIG. 5d is a view from above of the flow cell part shown in FIG. 5c.

FIG. 5a is a perspective view of a first or second flow path connector 5, 7 of an optical measuring device 1 as shown in FIGS. 1a, 2, 3 and 4. FIG. 5b is a perspective view of a first or second flow path connector 5', 7' of an optical measuring device 1' as shown in FIG. 1b. FIG. 5c is a perspective view of a flow cell part 3 of an optical measuring device 1 as shown in any one of the FIGS. 1-4. FIG. 5d shows the same flow cell part 3 as in FIG. 5c from above. In FIGS. 5a and 5b the connection device receiving holes 11a in the flow path connector 5, 7, 5', 7' can be seen and in FIGS. 5c and 5d the connection device receiving holes 11b in the flow cell part 3 can be seen. Furthermore the flow cell part flow passage 15 can be seen in the flow cell part 3. In the flow cell part flow passage 15 the light transmitting end 21a of the light transmitting device 21 and the light receiving end 23a of the light receiving device 23 can be seen and the optical path 25 is the distance between them.

According to the invention one or more flow cell parts, possibly with different optical path lengths, are provided in between a first and a second flow path connector having a suitable connection size and type. Hereby a modular system is provided and an optical measuring device can be built according to the user's own preference regarding optical path length, number of flow cell parts and connector type. According to one embodiment of the invention all parts in the flow cell part 3 are fixedly mounted and therefore there is no risk that the optical path length will change during maintenance (for example changing of sealing device) or exchange of flow cell part.

FIG. 6 is a perspective view of an optical measuring device 41 according to one embodiment of the invention. The first and second flow path connectors 5, 7 are the same as in the embodiment shown in for example FIG. 1a. The difference in this embodiment compared to the embodiment described in relation to FIG. 1a is that two flow cell parts 3a, 3b are provided between the first and second flow path connectors 5, 7. Possibly the optical path length in these two flow cell parts 3a, 3b are different. Hereby both high and low concentrations of a substance in a solution in the flow can be measured.

FIG. 7a is a perspective view of an optical measuring device 61 according to one embodiment of the invention. Here it is shown that four flow cell parts 3a, 3b, 3c, 3d can be provided between the first and second flow path connectors 5, 7. Possibly the optical path lengths in these four flow cell parts 3a, 3b, 3c, 3d are different. Hereby both high and low concentrations of a substance in a solution in the flow can be measured. The optical construction in the different flow cell parts can be different. For example lenses could be used for long path lengths and optical fibers for shorter path lengths.

FIG. 7b shows the optical measuring device 61 of FIG. 7a in cross section.

Figure 9:
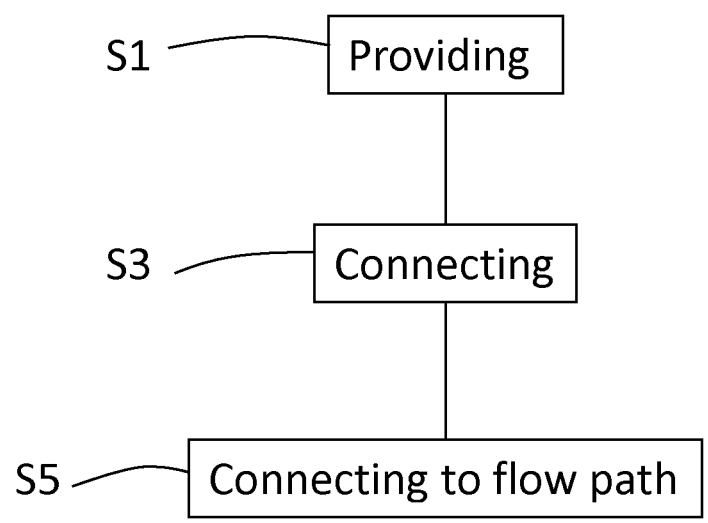
FIG. 9 is a flow chart of a method according to one embodiment of the invention.

FIG. 9 is a flow chart of a method for mounting an optical measuring device as described above in a flow path according to the invention. The method steps are described below:

S1: Providing the at least one flow cell part 3; 3a, 3b; 3a, 3b, 3c, 3d between the first and second flow path connectors 5, 5', 5", 7, 7', 7".

S3: Connecting the at least one flow cell part between the first and second flow path connectors by the connection device 9.

S5: Connecting the first and second flow path connectors 5, 5', 5", 7, 7', 7" in a flow path.

In one embodiment of the invention the step of providing at least one flow cell part comprises providing at least two flow cell parts having different optical path lengths.

The invention claimed is:

1. An optical measuring device configured for being connected in a flow path, said optical measuring device comprising:
 a first flow path connector and a second flow path connector spaced from the first flow path connector;
 at least two flow cell parts provided in a stacked arrangement along a flow direction in between the first and second flow path connectors such that a flow in a flow path in which the optical measuring device can be arranged will flow through the first flow path connector, the at least two flow cell parts, and through the second flow path connector in the flow direction, wherein the at least two flow cell parts are directly in contact with each other in the stacked configuration; and
 at least one releasable connection device arranged for releasably fluidically connecting the at least two flow cell parts to each other along the flow direction along the flow path in between the first and second flow path connectors, wherein the at least two flow cell parts each comprise a fixedly mounted light transmitting device and a fixedly mounted light receiving device,
 wherein an optical path of fixed length is provided between a light transmitting end of the light transmitting device and a light receiving end of the light receiving device, wherein said optical path is substantially transverse to the flow path,
 wherein said light transmitting device is configured to be connected to a light source and said light receiving device is configured to be connected to a detector such that said optical path is configured to be provided in a flow which will be transferred through the optical measuring device when it is connected to a flow path, and
 wherein the at least two flow cell parts have at least two different optical path lengths.

2. The optical measuring device according to claim 1, further comprising at least one sealing device provided in between each flow path connector and the at least one flow cell part and between each flow cell part if more than one are provided, said sealing device being provided for keeping a flow provided through the optical measuring device from a connected flow path inside the optical measuring device.

3. The optical measuring device according to claim 1, wherein the light transmitting device and/or the light receiving device are optical fibers fixedly mounted in the flow cell part such that they protrude into a flow cell part flow passage of the flow cell part through which flow passage the flow will pass when the optical measuring device is connected to a flow path.

4. The optical measuring device according to claim 3, wherein a connection end of the light transmitting device being the opposite end to the light transmitting end is provided with a distance cap and a connection end of the light receiving device being the opposite end to the light receiving end is provided with a distance cap, said distance caps being arranged to assure that a distance is kept between the light transmitting device and a connecting optical fiber and between the light receiving device and a connecting fiber.

5. The optical measuring device according to claim 1, wherein the connection device is at least one screw and nut and the first and second flow path connectors and the at least one flow cell part comprises mating connection device receiving holes for receiving the at least one screw during connection.

6. The optical measuring device according to claim 5, wherein the first and second flow path connectors comprise a flow path connecting part and a flange part, wherein said flange part comprises at least two diametric oppositely provided connection device receiving holes.

7. The optical measuring device according to claim 1, wherein the first and second flow path connectors can be adapted for different sizes of connecting flow paths and for different types of connectors.

8. The optical measuring device according to claim 1, wherein a first light guide holder is provided to a first end of the flow cell part and is arranged to provide connection capabilities for a connecting light guide to the light transmitting device of the flow cell part and a second light guide holder is provided to a second end of the flow cell part and is arranged to provide connection capabilities for a connecting light guide to the light receiving device of the flow cell part.

9. A method for mounting the optical measuring device according to claim 1 in a flow path, said method comprising the steps of:
 providing the at least one flow cell part between the first and second flow path connectors;

connecting the at least one flow cell part between the first and second flow path connectors by the connection device;

connecting the first and second flow path connectors in a flow path.

10. The method according to claim 9, wherein the step of providing at least one flow cell part comprises providing at least two flow cell parts having different optical path lengths.

11. The optical measuring device according to claim 1, wherein the at least two flow cell parts are arranged with adjacent ends facing each other along the flow direction.

12. The optical measuring device according to claim 1, wherein the second flow path connector is not unitary with the first flow path connector.

* * * * *